(12) United States Patent
Park et al.

(10) Patent No.: US 12,000,979 B2
(45) Date of Patent: Jun. 4, 2024

(54) POLARIZER PROTECTIVE FILM AND MANUFACTURING METHOD THEREOF

(71) Applicant: LG CHEM, LTD., Seoul (KR)

(72) Inventors: Jun Wuk Park, Daejeon (KR); Yi Rang Lim, Daejeon (KR); Sung In Kim, Daejeon (KR); Kyoung Won Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 554 days.

(21) Appl. No.: 16/622,587

(22) PCT Filed: Feb. 21, 2018

(86) PCT No.: PCT/KR2018/002136
§ 371 (c)(1),
(2) Date: Dec. 13, 2019

(87) PCT Pub. No.: WO2019/004559
PCT Pub. Date: Jan. 3, 2019

(65) Prior Publication Data
US 2021/0018665 A1    Jan. 21, 2021

(30) Foreign Application Priority Data
Jun. 29, 2017    (KR) .......................... 10-2017-0082806

(51) Int. Cl.
*G02B 1/14* (2015.01)
*C08J 5/18* (2006.01)
(Continued)

(52) U.S. Cl.
CPC .................. *G02B 1/14* (2015.01); *C08J 5/18* (2013.01); *C08J 7/043* (2020.01); *C08J 7/046* (2020.01);
(Continued)

(58) Field of Classification Search
CPC ..... G02B 1/14; G02B 5/305; G02F 1/133528; C09K 2323/03
See application file for complete search history.

(56) References Cited

U.S. PATENT DOCUMENTS

2006/0293448 A1    12/2006    Nishiura et al.
2007/0046870 A1    3/2007    Murakami et al.
(Continued)

FOREIGN PATENT DOCUMENTS

CN    1575970 A    2/2005
CN    101171297 A    4/2008
(Continued)

OTHER PUBLICATIONS

Office Action of Chinese Patent Office in Appl'n No. 201880037397. 8, dated Nov. 4, 2020.
(Continued)

*Primary Examiner* — Sophie Hon
(74) *Attorney, Agent, or Firm* — Bryan Cave Leighton Paisner LLP

(57) ABSTRACT

Provided are a polarizer protective film comprising a polymeric film and a coating layer formed on at least one surface of the polymeric film, where the coating layer has a plurality of concave embossed patterns and has a surface roughness of 2.0 nm to 20.0 nm, and a manufacturing method thereof.

12 Claims, 2 Drawing Sheets

(51) Int. Cl.
   *C08J 7/043*   (2020.01)
   *C08J 7/046*   (2020.01)
   *G02B 5/30*    (2006.01)
   *G02F 1/1335*  (2006.01)

(52) U.S. Cl.
   CPC ....... *G02B 5/305* (2013.01); *G02F 1/133528* (2013.01); *C09K 2323/03* (2020.08); *C09K 2323/035* (2020.08)

(56) References Cited

U.S. PATENT DOCUMENTS

| | | | |
|---|---|---|---|
| 2008/0166549 A1 | 7/2008 | Shieh et al. | |
| 2012/0064350 A1* | 3/2012 | Honya | G03G 15/162 399/302 |
| 2013/0029118 A1 | 1/2013 | Kishi et al. | |
| 2013/0090403 A1 | 4/2013 | Jung et al. | |
| 2013/0265529 A1 | 10/2013 | Wakizaka et al. | |
| 2015/0102328 A1 | 4/2015 | Shin et al. | |
| 2016/0187682 A1* | 6/2016 | Oh | G02B 5/045 349/96 |
| 2016/0195660 A1 | 7/2016 | Nakao | |
| 2017/0210915 A1 | 7/2017 | Lee et al. | |
| 2017/0307783 A1* | 10/2017 | Hongo | G02B 1/14 |
| 2019/0016932 A1* | 1/2019 | Munekata | C09J 133/14 |

FOREIGN PATENT DOCUMENTS

| | | | | |
|---|---|---|---|---|
| CN | 103502007 A | | 1/2014 | |
| CN | 105378519 | | 3/2016 | |
| CN | 105555849 A | | 5/2016 | |
| CN | 110720057 B | * | 4/2022 | ............. B29D 11/00 |
| EP | 3620831 B1 | * | 9/2021 | ............. B29D 11/00 |
| JP | 2003043203 A | * | 2/2003 | |
| JP | 2007-145428 | | 6/2007 | |
| JP | 2007182519 | | 7/2007 | |
| JP | 2008-201507 | | 9/2008 | |
| JP | 2008-260268 | | 10/2008 | |
| JP | 2010152056 | | 7/2010 | |
| JP | 2011076954 A | * | 4/2011 | ........ G02F 1/133611 |
| JP | 2011-128408 | | 6/2011 | |
| JP | 2011189589 A | | 9/2011 | |
| JP | 2012-133079 | | 7/2012 | |
| JP | 2012133079 A | * | 7/2012 | |
| JP | 2016117243 A | | 6/2016 | |
| JP | 2016-126351 | | 7/2016 | |
| JP | 2017-067819 | | 4/2017 | |
| JP | 2017-072846 | | 4/2017 | |
| JP | 2019203931 A | * | 11/2019 | |
| JP | 6966054 B2 | * | 11/2021 | ............. B29D 11/00 |
| KR | 10-20090126519 | | 12/2009 | |
| KR | 10-20110027298 | | 3/2011 | |
| KR | 10-20120055803 | | 6/2012 | |
| KR | 10-20140148335 | | 12/2014 | |
| KR | 10-20160015181 | | 2/2016 | |
| KR | 10-2017-0070558 | | 6/2017 | |
| KR | 102089717 B1 | * | 3/2020 | ............... G02B 1/14 |
| WO | 2007-026575 | | 3/2007 | |
| WO | 2010150577 | | 12/2010 | |
| WO | 2011-129354 | | 10/2011 | |
| WO | 2012008757 | | 1/2012 | |
| WO | 2017-057526 | | 4/2017 | |

OTHER PUBLICATIONS

International Search Report and the Written Opinion of PCT/KR2018/002136, mailed May 23, 2018.

Office Action of Japanese Patent Office in Appl'n No. 2019-559060, dated Sep. 23, 2020.

* cited by examiner

POLARIZER PROTECTIVE FILM AND MANUFACTURING METHOD THEREOF

CROSS-REFERENCE TO RELATED APPLICATIONS

This application is a National Stage Application of International Application No. PCT/KR2018/002136 filed on Feb. 21, 2018, which claims priority to Korean Patent Application No. 10-2017-0082806, filed on Jun. 29, 2017, the entire contents of which are fully incorporated herein by reference.

FIELD OF THE INVENTION

The present invention relates to a polarizer protective film and a manufacturing method thereof. More particularly, the present invention relates to a polarizer protective film capable of exhibiting excellent physical and optical properties and preventing a lower polarizing plate from being damaged, and a manufacturing method thereof.

BACKGROUND

Liquid crystal display (LCD) devices are one of the most widely used flat panel displays at present. In general, a liquid crystal display device has a structure in which a liquid crystal layer is enclosed between a TFT (Thin Film Transistor) array substrate and a color filter substrate. When an electric field is applied to electrodes present on the array substrate and the color filter substrate, arrangement of liquid crystal molecules in the liquid crystal layer enclosed therebetween changes, which allows image display.

In the liquid crystal display device, as light emitted from a light source passes through a light guide plate and a diffusion sheet, its brightness is reduced. Therefore, a prism sheet is included for collecting the light again to increase the brightness. Such a prism sheet is usually provided under the lower polarizing plate. As displays become larger, a sagging phenomenon of the lower polarizing plate occurs, thereby causing damages such as grinding of the lower polarizing plate by the uneven structure of the prism sheet contacting the lower polarizing plate. To solve this problem, a method of coating a hard coating layer onto the protective film of the lower polarizing plate has been proposed, but there is a problem of an increase in process costs.

In accordance with these needs, there is still a need to develop a method capable of preventing damage to the lower polarizing plate and an increase in haze due to a lower structure, while promoting productivity and cost competitiveness in mass production.

SUMMARY OF THE INVENTION

In order to address the above problems, the present invention provides a polarizer protective film capable of exhibiting excellent scratch resistance, and a manufacturing method thereof.

In order to address the above problems, an aspect of the present invention provides a polarizer protective film including a polymeric film; and a coating layer formed on at least one surface of the polymeric film, wherein the coating layer has a plurality of concave embossed patterns and a surface roughness (Ra) of 2.0 nm to 20.0 nm.

Another aspect of the present invention provides a method of manufacturing the polarizer protective film, the method including the steps of:

coating a photocurable coating composition including a photocurable binder, a silicon-based or fluorine-based compound, and a polymerization initiator onto at least one surface of a polymeric film;

heat-treating the polymeric film onto which the coating composition is coated; and photo-curing the coating composition to form a coating layer having a plurality of concave embossed patterns and a surface roughness (Ra) of 2.0 nm to 20.0 nm.

According to the polarizer protective film of the present invention and the manufacturing method thereof, it is possible to provide, with a high productivity, a thin polarizer protective film having sufficient scratch resistance, and a polarizing plate including the same.

Further, it is possible to exhibit excellent optical properties by preventing the problems that, due to the unevenness of other structure(s) provided under the polarizing plate, the lower protective film of the polarizing plate can be damaged causing an increase in haze, and some of the damaged film can come out as a foreign substance causing defects.

Further, since these effects are obtainable by applying the present invention to the lower polarizing plate of an LCD without changing the laminated structure of an LCD, no excessive process change or cost increase is required, thereby reducing production cost.

DETAILED DESCRIPTION OF THE EMBODIMENTS

Figure 1:
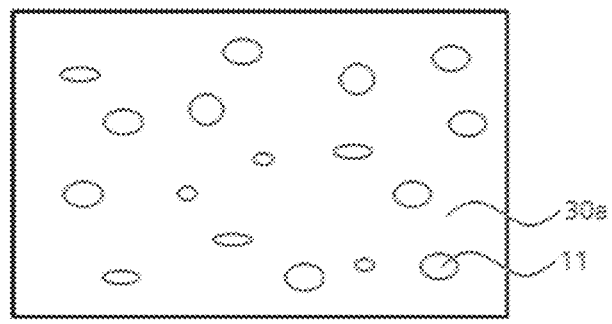
FIG. 1 is a plain view showing a polarizer protective film according to an embodiment of the present invention.

In the present invention, the term 'upper surface' refers to a surface arranged to face a viewer when a polarizing plate is mounted on a device such as a liquid crystal display. The term 'upper' refers to a direction directed toward a viewer when the polarizing plate is mounted on the device. Conversely, the term 'lower surface' or 'lower' refers to a surface or a direction arranged to face a side opposite to a viewer when the polarizing plate is mounted on the device.

Since a variety of modifications can be made to the present invention and there can be various forms of the present invention, its specific examples are illustrated and will be described in detail below. However, it should be understood that this is not intended to limit the present invention to particular forms disclosed herein, and the invention encompasses all modifications, equivalents, or alternatives falling within the spirit and technical scope of the present invention.

Hereinafter, a polarizer protective film of the present invention and a manufacturing method thereof will be described in more detail.

I. Polarizer Protective Film

A polarizer protective film according to an embodiment of the present invention is characterized by including a polymeric film and a coating layer formed on at least one surface of the polymeric film, wherein the coating layer has a plurality of concave embossed patterns and a surface roughness (Ra) of 2.0 nm to 20.0 nm.

A polarizer exhibits a property capable of extracting only light vibrating in one direction from the light made incident while vibrating in various directions. The polarizer protective film of the present invention is used for protecting the polarizer from the outside and is used on at least one surface of the polarizer, preferably, as a lower protective film of the polarizer.

As displays become larger and slimmer, a sagging phenomenon of an LCD panel occurs during transfer, which causes the protective film of the lower polarizing plate to be damaged by a prism sheet or a diffusion film provided under the lower polarizing plate, leading to an increase in haze.

The present invention is intended to complement these problems, wherein among components included in an LCD, a polarizing plate, especially, a lower polarizing plate can be improved without changing the structure of a backlight, a color filter, or an LCD to include a coating layer having a plurality of concave embossed patterns and having scratch resistance on the polarizer protective film of the lower polarizing plate, thereby preventing the problem of an increase in haze due to a prism sheet or a diffusion film.

Thus, the polarizer protective film of the present invention can exhibit excellent scratch resistance due to the coating layer having a plurality of concave embossed patterns and a predetermined surface roughness, thereby effectively protecting the lower polarizing plate and being usefully applicable to a polarizing plate for displays which become thinner and larger.

That is, in the polarizer protective film of the present invention, the coating layer is characterized by having a plurality of concave embossed patterns and a surface roughness (Ra) of 2.0 nm to 20.0 nm. As a result, it is possible to alleviate a surface grinding phenomenon which is caused by the friction with other structures in contact with the polarizer protective film, particularly, a sheet or a film having convex patterns such as a prism sheet or a diffusion sheet, and to provide excellent scratch resistance, as compared with a protective film having not concave embossed patterns but convex embossed patterns or having no embossed patterns.

More particularly, the coating layer can have a surface roughness from about 2.0 nm or more, or about 3.0 nm or more, or about 4.0 nm or more, to about 20.0 nm or less, or about 15.0 nm or less, or about 10.0 nm or less. When the surface roughness of the coating layer is less than 2.0 nm or more than 20.0 nm, sufficient scratch resistance may not be exhibited.

According to one embodiment of the present invention, the embossed patterns have a circular or elliptical shape at the outermost surface of the coating layer and a depressed shape in a thickness direction of the coating layer, so that the coating layer has a concave depressed shape.

According to one embodiment of the present invention, a diameter of the embossed patterns at the outermost surface of the coating layer can be in a range from about 0.1 μm or more, or about 0.5 μm or more, or about 1 μm or more, to about 20 μm or less, or about 10 μm or less, or about 5 μm or less.

Further, a depth of the embossed patterns in the direction of the coating layer can be in a range from about 1 nm or more, or about 5 nm or more, or about 10 nm or more, to about 1 μm or less, or about 500 nm or less, or about 100 nm or less.

Further, the area occupied by the embossed patterns in the coating layer can be in a range from about 20% or more, or about 30% or more, to about 80% or less, or about 70% or less, calculated as a ratio of the outermost surface area of the embossed patterns with respect to the total area of the coating layer A thickness of the coating layer is not particularly limited, but it can be about 50 nm or more, for example, about 100 nm or more, or about 200 nm or more, or about 500 nm or more, or about 1 μm or more, to about 20 μm or less, or about 10 μm or less, or about 7 μm or less, or about 5 μm or less, or about 3 μm or less, in order to provide a thin polarizer protective film satisfying mechanical properties.

Since a plurality of the embossed patterns having the shape and distribution in the above-described range are formed in the coating layer and the coating layer has a predetermined range of surface roughness, the coating layer can exhibit excellent scratch resistance with respect to lower structures without reduction of adhesiveness and strength.

Figure 2:
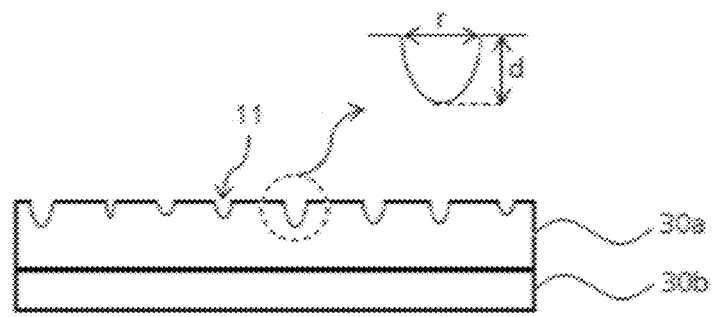
FIG. 2 is a cross-sectional view showing a polarizer protective film according to an embodiment of the present invention.

FIG. 1 is a plain view showing a polarizer protective film according to an embodiment of the present invention, and FIG. 2 is a cross-sectional view showing a polarizer protective film according to an embodiment of the present invention.

Referring to FIGS. 1 and 2, a polarizer protective film according to an embodiment of the present invention can include a polymeric film 30b, and a coating layer 30a formed on one surface of the polymeric film 30b, wherein the coating layer 30a has a plurality of concave embossed patterns 11.

The concave embossed patterns 11 have a circular or elliptical shape having a diameter r when viewed from the surface of the coating layer 30a and a depressed shape having a depth d in the thickness direction of the coating layer 30a. The ranges of the diameter r and the depth d are as described above.

The polymeric film is not particularly limited, as long as it is commonly usable as a base film of a polarizer protective film and is a stretchable film. For example, a film including a polyester, a polyethylene, a cyclic olefin polymer (COP), a cyclic olefin copolymer (COC), a polyacrylate (PAC), a polycarbonate (PC), a polymethylmethacrylate (PMMA), a polyimide (PI), a triacetylcellulose (TAC), or a cellulose can be used.

The thickness of the polymeric film is not particularly limited, but can have a thickness from about 20 μm to about 200 μm, or about 30 μm to about 100 μm.

In addition, a method of molding the polymeric film is not particularly limited, and the polymeric film can be prepared by a suitable film molding method, for example, a solution casting method, a melt extrusion method, a calendering method, or a compression molding method, etc.

According to an embodiment of the present invention, the polymeric film can be prepared using a coating composition including a photocurable binder, a silicon-based or fluorine-based compound, and a polymerization initiator according to a method of manufacturing the polarizer protective film of the present invention described below. The coating composition and the preparation method thereof are described below.

In the case of a stretched film, when the polymer is rearranged in a stretching process and a functional coating layer or the like is additionally formed on the stretched film, there is a problem that adhesiveness is decreased. Therefore, a method including a separate step such as formation of a primer layer for promoting the adhesiveness, or a method in which a coating layer includes a functional compound capable of promoting adhesiveness has been proposed. In this case, there are problems that productivity is decreased since a separate step is added in the manufacturing process, and it is difficult to develop general purpose primers since each film has different physical and chemical properties. In addition, adding a functional compound to a coating layer for promoting adhesiveness can cause a problem such as an increase of costs and deterioration of other properties.

However, according to an embodiment of the present invention, it is possible to provide a polarizer protective film having high adhesiveness to a polymeric film which is a base, having sufficient scratch resistance, and being thinner, even without a separate primer layer.

The polarizer protective film according to an embodiment of the present invention can exhibit scratch resistance to such an extent that scratches and grinding hardly occur on the surface of the coating layer of the polarizer protective film of the present invention and other sheets, even after applying vibration (applied vibration strength of 2.8 Grms, frequency of 20-60 Hz) for 240 seconds under a load of 300 g while stacking the coating layer of the polarizer protective film of the present invention and other sheets having convex patterns (e.g., a diffusion sheet) in a sample holder (50 mm×50 mm) connected with a vibrator.

II. Method of Manufacturing Polarizer Protective Film

According to another embodiment of the present invention, provided is a method of manufacturing the polarizer protective film, the method including the steps of: coating a photocurable coating composition including a photocurable binder, a silicon-based or fluorine-based compound, and a polymerization initiator onto at least one surface of a polymeric film; heat-treating the polymeric film onto which the coating composition has been coated; and photo-curing the coating composition to form a coating layer having a plurality of concave embossed patterns and a surface roughness (Ra) of 2.0 nm to 20.0 nm.

When the polarizer protective film is used as a protective film of the lower polarizing plate, damages frequently occur, such as grinding of the lower polarizing plate which is caused by the friction with other structures in contact with the lower polarizing plate, particularly a sheet or a film having convex patterns such as a prism sheet or a diffusion sheet. In order to solve this problem, the protective film of the lower polarizing plate is required to have scratch resistance. To promote scratch resistance, a method of coating a hard coating layer thereto has been proposed, but there is a problem of an increase in process costs.

However, according to the manufacturing method of the present invention, a coating composition satisfying predetermined conditions is applied onto the polymeric film, which is then heat-treated, and the coating composition is cured to form a coating layer having a plurality of concave embossed patterns and a surface roughness (Ra) in the range of 2.0 nm to 20.0 nm, thereby providing a polarizer protective film having high adhesiveness to the polymeric film and high surface scratch resistance without a separate primer layer.

Depending on the coating composition, the coating layer may not have sufficient strength and scratch resistance. Therefore, according to a manufacturing method of the present invention, the coating composition including a silicon-based or fluorine-based compound is applied onto the polymeric film, and heat-treated before curing to allow a microphase separation of the silicon-based or fluorine-based compound. As a result, a plurality of concave embossed patterns can be formed on the surface of the coating layer, and a predetermined surface roughness can be exhibited, thereby providing a polarizer protective film described above.

According to an embodiment of the present invention, the heat treatment process and the stretching process can be performed at the same time.

To provide a polarizer protective film having excellent mechanical properties, a stretched film can be used as a base film. However, in the case of the stretched film, when the polymer is rearranged in a stretching process and a functional coating layer or the like is additionally formed on the stretched film, there is a problem that adhesiveness is decreased. Therefore, a method of adding a separate step such as formation of a primer layer for promoting adhesiveness, or a method of including, in a coating layer, a functional compound capable of promoting adhesiveness has been proposed. In this case, there are problems that productivity is decreased since a separate step is added in the manufacturing process, and it is difficult to develop general purpose primers since each film has different physical and chemical properties. In addition, adding of a functional compound to a coating layer for promoting adhesiveness can cause a problem such as an increase of costs and deterioration of other properties.

Therefore, according to the manufacturing method of an embodiment of the present invention, it is possible to prepare, with a high productivity, a polarizer protective film having high adhesiveness to a polymeric film which is a base, and having sufficient scratch resistance, even without a separate primer layer.

The polymeric film is not particularly limited, as long as it is commonly usable as a base film of a polarizer protective film and is a stretchable film. For example, a film including a polyester, a polyethylene, a cyclic olefin polymer (COP), a cyclic olefin copolymer (COC), a polyacrylate (PAC), a polycarbonate (PC), a polymethylmethacrylate (PMMA), a polyimide (PI), a triacetylcellulose (TAC), or a cellulose can be used.

According to an embodiment of the present invention, the coating composition can be applied onto one surface of the polymeric film in its unstretched state.

Alternatively, according to another embodiment of the present invention, the polymeric film can be uniaxially stretched before applying the coating composition thereon.

In this case, the stretching direction is not particularly limited, and the stretching can be performed such that a stretching ratio is 1.1 times or more, 1.2 times or more, or 1.5 times or more, to 5 times or less, or 3 times or less, based on the length in the stretching direction.

The coating composition is applied onto at least one surface of the unstretched or uniaxially stretched polymeric film.

A method of applying the coating composition is not particularly limited as long as it can be used in the art to which the present technology belongs. For example, a bar coating method, a knife coating method, a roll coating method, a blade coating method, a die coating method, a microgravure coating method, a comma coating method, a slot die coating method, a lip coating method, or a solution casting method, or the like can be used.

The coating composition for forming the coating layer of the polarizer protective film can include a silicon-based or fluorine-based compound.

The silicon-based compound can be exemplified by an unreactive silicon-based compound including a silicon group such as dimethyl siloxane or methyl siloxane, and an alkyl group or a polyether group; or a reactive silicon-based compound including a silicon group and a vinyl group, a (meth)acrylate group, or a (meth)acryloxy group; a resin, oil, or surfactant having a silicon group, etc. Preferably, a reactive silicon-based compound including a silicon group and a vinyl group, a (meth)acrylate group, or a (meth) acryloxy group can be used.

The fluorine-based compound can be exemplified by an unreactive fluorine-based compound including a fluorine group such as a fluoroalkyl group; or a reactive fluorine-based compound including a fluorine group and a vinyl group, a (meth)acrylate group, or a (meth)acryloxy group; a resin, oil, or surfactant having a fluorine group, etc., but the present invention is not limited thereto.

According to an embodiment of the present invention, the silicon-based or fluorine-based compound can be present in an amount from about 0.2 parts by weight or more, or about 0.3 parts by weight or more, or about 0.5 parts by weight, or about 1 parts by weight or more, to about 10 parts by weight or less, or about 8 parts by weight or less, or about 6 parts by weight or less with respect to 100 parts by weight of the photocurable binder in the coating composition. When the content of the silicon-based or fluorine-based compound is too small, concave embossed patterns may not be formed well, and the scratch resistance effect can be low. When the content of the silicon-based or fluorine-based compound is too large, concave embossed patterns can be excessively formed, and thus strength of the polarizer protective film can be deteriorated.

The coating composition can include a photocurable binder.

According to an embodiment of the present invention, the photocurable binder can be a radical curable binder.

The radical curable binder is not particularly limited, as long as it is a compound including an unsaturated functional group capable of causing a photo-curing reaction by free radicals. The radical curable binder can be a compound including a (meth)acrylate group, an allyl group, an acryloyl group, or a vinyl group as the unsaturated functional group.

When the radical curable binder is included as the photocurable binder, a radical polymerization initiator is included together therewith. The radical polymerization initiator facilitates radical polymerization to improve a curing rate.

As the radical polymerization initiator, radical polymerization initiators generally used in the art can be used without limitation, and for example, the radical polymerization initiator can be one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy) phenyl]-2-methyl-1-propanone, methylbenzoylformate, oxy-phenyl-acetic acid-2-[2 oxo-2-phenyl-acetoxy-ethoxy]-ethyl ester, oxy-phenyl-acetic acid-2-[2-hydroxy-ethoxy]-ethyl ester, alpha-dimethoxy-alpha-phenyl acetophenone, 2-benzyl-2-(dimethylamino)-1-[4-(4-morpholinyl) phenyl]-1-butanone, 2-methyl-1-[4-(methylthio) phenyl]-2-(4-morpholinyl)-1-propanone, diphenyl (2,4,6-trimethylbenzoyl)-phosphine oxide, phenyl bis(2,4,6-trimethyl benzoyl) phosphine oxide. In the present invention, phenyl bis(2,4,6-trimethyl benzoyl) phosphine oxide) is preferred.

A content of the radical polymerization initiator can be about 0.1 part by weight to about 10 parts by weight, preferably about 0.1 part by weight to about 5 parts by weight with respect to 100 parts by weight of the total radical curable binder.

According to another embodiment of the present invention, a cationic curable binder can be used as the photocurable binder. Further, the cationic curable binder can be an epoxy-based compound.

According to an embodiment of the present invention, a weight average molecular weight of the epoxy-based compound is not particularly limited, but for example, in the range from about 100 g/mol to about 5,000 g/mol, or about 200 g/mol to about 5,000 g/mol. When the weight average molecular weight of the epoxy-based compound is too high, coatability can become poor due to high viscosity. When the weight average molecular weight is too low, the hardness can be decreased. Thus, the weight average molecular weight of the cationic curable binder is preferably within an above range.

The epoxy-based compound is a binder which contains at least one epoxy group and is initiated to cure by cations generated from a cationic polymerization initiator upon UV irradiation. Examples thereof can include an aromatic epoxy-based compound, a hydrogenated epoxy-based compound, an alicyclic epoxy-based compound, an aliphatic epoxy-based compound and the like. An alicyclic epoxy-based compound can be preferably used.

The aromatic epoxy-based compound is an epoxy-based compound containing at least one aromatic hydrocarbon ring in its molecule, and can include, but is not limited thereto, for example, a bisphenol type epoxy resin such as diglycidyl ether of bisphenol A, diglycidyl ether of bisphenol F, diglycidyl ether of bisphenol S; a novolac type epoxy resin such as a phenol novolac epoxy resin, a cresol novolac epoxy resin, a hydroxybenzaldehyde phenol novolac epoxy resin; a multifunctional epoxy resin such as glycidyl ether of tetrahydroxyphenyl methane, glycidyl ether of tetrahydroxybenzophenone, epoxidized polyvinylphenol; and the like.

In addition, the hydrogenated epoxy-based compound is an epoxy-based compound obtained by selectively hydrogenating an aromatic epoxy-based compound under pressure in the presence of a catalyst. Among them, diglycidyl ether of hydrogenated bisphenol A is preferably used, but is not limited thereto.

Further, the alicyclic epoxy-based compound is an epoxy-based compound in which an epoxy group is formed between two adjacent carbon atoms constituting an aliphatic hydrocarbon ring, and can include, but is not limited to, for example, 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinylcyclohexanedioxide, bis(3,4-epoxycyclohexylmethyl) adipate, bis(3,4-epoxy-6-methylcyclohexylmethyl)adipate, exo-exobis(2,3-epoxycyclopentyl)ether, endo-exobis(2,3-epoxy cyclopentyl)ether, 2,2-bis[4-(2,3-epoxypropoxy)cyclohexyl]propane, 2,6-bis(2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadienedioxide, 1,2-epoxy-6-(2,3-epoxypropoxy)hexahydro-4,7-methanoindane, p-(2,3-epoxy)cyclopentylphenyl-2,3-epoxypropyl ether, 1-(2,3-epoxypropoxy)phenyl-5,6-epoxyhexahydro-4,7-methanoindane, o-(2,3-epoxy) cyclopentylphenyl-2,3-epoxypropyl ether), 1,2-bis[5-(1,2-epoxy)-4,7-hexahydromethanoindanoxyl]ethanocyclopentenylphenyl glycidyl ether, methylene bis(3,4-epoxycyclohexane)ethyleneglycoldi(3,4-epoxycyclohexylmethyl) ether, ethylene bis(3,4-epoxycyclohexanecarboxylate), ε-caprolactone (1 to 10 mol) adduct with 3,4-epoxycyclohexane methanol and esterified compounds of multivalent (value of 3 to 20) alcohols (GR, TMP, PE, DPE, hexapentaerythritol), and the like. Among them, from the viewpoint of reactivity, 3,4-epoxycyclohexylmethyl-3,4-epoxycyclohexanecarboxylate is preferably used.

According to an embodiment of the present invention, an oxetane-based compound can be further included as the cationic curable binder.

The oxetane-based compound is a binder that contains at least one oxetane group and is initiated to cure by cations generated from a cationic polymerization initiator upon UV irradiation. It can be used without particular limitation to its type.

The oxetane-based compound can lower the viscosity of the coating composition and can further enhance the curing rate.

More specifically, the oxetane-based compound can include, for example, 3-ethyl-3-[(3-ethyloxetan-3-yl) methoxymethyl]oxetane, 1,4-bis[(3-ethyloxetane-3-yl) methoxymethyl]benzene, 1,4-bis[(3-ethyloxetane-3-yl) methoxyl]benzene, 1,3-bis[(3-ethyloxetan-3-yl)methoxy] benzene, 1,2-bis[(3-ethyloxetan-3-yl)methoxy]benzene, 4,4'-bis[(3-ethyloxetan-3-yl)methoxy]biphenyl, 2,2'-bis[(3-ethyloxetan-3-yl)methoxy]biphenyl, 3,3',5,5'-tetramethyl-4,4'-bis[3-ethyloxetan-3-yl)methoxy]biphenyl, 2,7-bis[(3-ethyloxetan-3-yl)methoxy]naphthalene, bis{4-[(3-ethyloxetan-3-yl)methoxy]phenyl}methane, bis{2-[3-ethyloxetan-3-yl) methoxy]phenyl}methane, 2,2-bis{4-[(3-ethyloxetan-3-yl) methoxy]phenyl}propane, an etherified modification of novolac type phenol-formaldehyde resin with 3-chloromethyl-3-ethyloxetane, 3(4), 8(9)-bis[(3-ethyloxetane-3-yl) methoxymethyl]-tricyclo[5.2.10.0 2,6]decane, 2,3-bis[(3-ethyloxetan-3-yl)methoxymethyl]norborane, 1,1,1-tris[(3-ethyloxetan-3-yl)methoxymethyl]propane, 1-butoxy-2,2-bis [(3-ethyloxetan-3-yl)methoxymethyl]butane, 1,2-bis{[2-(3-ethyloxetan-3-yl)methoxy]ethylthio}ethane, bis{[4-(3-ethyloxetan-3-yl)methylthio]phenyl}sulfide, 1,6-bis[(3-ethyloxetan-3-yl)methoxy]-2,2,3,3,4,4,5,5-octafluorohexane, and the like.

According to an embodiment of the present invention, a compound that is used can be obtained by reaction of 3-ethyl-3-(hydroxymethyl)oxetane with one or more compounds selected from the group including m-tetramethylxylene diisocyanate azelaoyl chloride, terephthaloyl chloride, and 1,3,5-benzene tricarbonyl trichloride.

When the oxetane-based compound is further included, a content thereof can be about 5 parts by weight to about 80 parts by weight, preferably about 10 parts by weight to about 60 parts by weight with respect to 100 parts by weight of the epoxy-based compound. When the content of the oxetane-based compound is too high, hardness of the coating layer after curing can be decreased. When the content of the oxetane-based compound is too low, the effect shown by addition of the oxetane-based compound is insignificant. Thus, the above range of part by weight is preferable.

When the cationic curable binder is included as the photocurable binder, a cationic polymerization initiator is included together therewith. The cationic polymerization initiator is a compound that produces a cationic species or Lewis acid by irradiation with active energy rays such as UV and acts on a cationic polymerizable group such as an epoxy group to initiate a cationic polymerization reaction.

In this regard, as the cationic polymerization initiator, any cationic polymerization initiators commonly used in the art can be used without limitation. For example, as the cationic polymerization initiator, those containing a sulfonium salt or an iodonium salt can be preferably used.

Specific examples of the cationic polymerization initiator containing a sulfonium salt or an iodonium salt can include, but are not limited to, one or more selected from the group consisting of diphenyl(4-phenylthio)phenyl sulfonium hexafluoroantimonate, diphenyl(4-phenylthio)phenyl sulfonium hexafluorophosphate, (phenyl)[4-(2-methylpropyl) phenyl]-iodonium hexafluorophosphate, (thiodi-4,1-phenylene)bis(diphenyl sulfonium)dihexafluoroantimonate and (thiodi-4,1-phenylene)bis(diphenyl sulfonium) dihexafluorophosphate.

A content of the cationic polymerization initiator can be about 0.1 part by weight to about 10 parts by weight, preferably about 0.1 part by weight to about 5 parts by weight with respect to 100 parts by weight of the total cationic curable binder.

According to an embodiment of the present invention, the coating composition can further include a heat-curable binder and a thermal polymerization initiator. When the coating composition includes a heat-curable binder, a thermal curing process can be added during curing of the coating composition.

The coating composition of the present invention can be used in a solvent-free type without any solvent, or if necessary, an organic solvent commonly used in the art can be used in a small amount, for example, about 100 parts by weight or less with respect to 100 parts by weight of the total coating composition.

Examples of a usable organic solvent can include an alcohol-based solvent such as methanol, ethanol, isopropyl alcohol, and butanol; an alkoxy alcohol-based solvent such as 2-methoxyethanol, 2-ethoxyethanol, and 1-methoxy-2-propanol; a ketone-based solvent such as acetone, methyl ethyl ketone, methyl isobutyl ketone, methyl propyl ketone, and cyclohexanone; an ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, and diethylene glycol-2-ethylhexyl ether; an aromatic solvent such as benzene, toluene, and xylene; and the like, and these solvents can be used alone or in a mixture thereof.

In addition to the aforementioned components, the coating composition of the present invention can further include an additive commonly used in the art to which the present invention belongs, such as an antioxidant, a UV stabilizer, an antifouling agent, an antiblocking agent, an antistatic agent, a UV absorber, a deforming agent, and a preservative. In addition, a content thereof can be variously adjusted within a range that does not deteriorate the properties of the coating composition of the present invention. Thus, there is no particular limitation thereto. For example, it can be included in an amount from about 0.1 part by weight to about 20 parts by weight with respect to 100 parts by weight of the total coating composition.

Next, the polymeric film onto which the coating composition has been coated is heat-treated.

The coating composition including the silicon-based or fluorine-based compound is applied onto the polymeric film, and then the polymeric film onto which the coating composition has been applied is heat-treated, followed by photocuring. As a result, in the process of heat-treating the silicon-based or fluorine-based compound, a microphase separation occurs to form a plurality of concave embossed patterns on the coating layer, of which surface roughness can be in the range of 2.0 nm to 20.0 nm.

Due to a plurality of concave embossed patterns formed on the surface of the coating layer and surface roughness thereof, the coating layer can have high durability with respect to scratches which are generated due to contact with a prism sheet or a diffusion sheet, thereby preventing haze increase, which is caused by damages of the protective film of the lower polarizing plate.

The heat treatment temperature can be about 80° C. or higher, or about 100° ° C. or higher, or about 120° C. or higher, to about 200° C. or lower, or about 180° C. or lower, or about 160° C. or lower. When the heat treatment temperature is too low, concave embossed patterns may not be formed. When the heat treatment temperature is too high, thermal deformation of the base film can occur, and thus, the above temperature range is preferred.

According to an embodiment of the present invention, the heat treatment process and the step of stretching the polymeric film onto which the coating composition has been applied can be performed at the same time.

The stretching direction is not particularly limited, and the stretching can be performed such that a stretching ratio is 1.05 times or more, 1.2 times or more, or 1.5 times or more, to 10 times or less, 5 times or less, or 3 times or less, based on the length in the stretching direction. When the stretching ratio is less than 1.05 times, the effect of stretching may not be sufficiently achieved. If the stretching ratio is more than 10 times, the coating layer can be cracked. Thus, it is preferable to perform the stretching within the aforementioned stretching ratio.

If the polymeric film is in a uniaxially stretched state before application of the coating composition, it is preferable to perform the stretching such that the stretching direction after the coating is perpendicular to the stretching direction before application of the coating composition. For example, if the polymeric film is stretched in the length (machine direction, MD) direction before application of the coating composition, it can be stretched in the width (transverse direction, TD) direction after application of the coating composition.

In addition, if the polymeric film is stretched, respectively, before and after applying the coating composition, the stretching can be performed such that the total stretching ratio is 1.1 times or more, or 1.2 times or more, or 1.5 times or more, to 25 times or less, or 10 times or less, or 7 times or less, based on the total stretching area of the polymeric film. When the stretching ratio is less than 1.1 times, the effect of stretching may not be sufficiently achieved. If the stretching ratio is more than 25 times, the coating layer can be cracked. Thus, it is preferable to perform the stretching within the aforementioned stretching ratio.

Next, a photo-curing reaction can be performed by irradiating the applied coating composition with UV, thereby forming the coating layer. The dose of the ultraviolet rays can be, for example, about 20 mJ/cm$^2$ to about 800 mJ/cm$^2$. The light source for UV irradiation is not particularly limited as long as it can be used in the art to which the present technology belongs. For example, a high-pressure mercury lamp, a metal halide lamp, a black light fluorescent lamp, or the like can be used.

When the heat treatment process and the stretching of the polymeric film onto which the coating composition has been applied are performed at the same time according to an embodiment of the present invention, the coating layer is stretched while being integrated with the stretched polymeric film, and thus it is advantageous to provide a thin polarizer protective film having high adhesiveness with the polymeric film, which is a base, even without a separate primer layer.

The coating composition including the silicon-based or fluorine-based compound is applied onto the polymeric film, and then the polymeric film onto which the coating composition has been applied is stretched, followed by photo-curing. As a result, in the process of heat-treating the silicon-based or fluorine-based compound or in the process of stretching the silicon-based or fluorine-based compound under heat-treatment, a microphase separation occurs to form a plurality of concave embossed patterns on the coating layer. Due to the concave embossed patterns, grinding that is caused by friction with another layer or film in contact with the polarizer protective film can be alleviated, thereby providing excellent scratch resistance.

According to an embodiment of the present invention, the embossed patterns have a circular or elliptical shape at the outermost surface of the coating layer and a depressed shape in a thickness direction of the coating layer, so that the coating layer has a concave depressed shape.

According to an embodiment of the present invention, a diameter of the embossed patterns at the outermost surface of the coating layer can be in the range from about 0.1 μm or more, or about 0.5 μm or more, or about 1 μm or more, to about 20 μm or less, or about 10 μm or less, or about 5 μm or less.

Further, a depth of the embossed patterns in the direction of the coating layer can be in the range from about 1 nm or more, or about 5 nm or more, or about 10 nm or more, to about 1 μm or less, or about 500 nm or less, or about 100 nm or less.

Further, the area occupied by the embossed patterns in the coating layer can be in the range from about 20% or more, or about 30% or more, to about 80% or less, or about 70% or less, calculated as a ratio of the outermost surface area of the embossed patterns with respect to the total area of the coating layer.

Due to a plurality of the embossed patterns, the coating layer can have a surface roughness (Ra) from about 2.0 nm or more, or about 3.0 nm or more, or about 4.0 nm or more, to about 20.0 nm or less, or about 15.0 nm or less, or about 10.0 nm or less.

According to an embodiment of the present invention, a final thickness of the coating layer after drying, stretching, and curing can be about 50 nm or more, for example, about 100 nm or more, or about 200 nm or more, or about 500 nm or more, or about 1 μm or more, to about 20 μm or less, or about 10 μm or less, or about 7 μm or less, or about 5 μm or less, or about 3 μm or less. As such, the coating layer of the present invention can be made thin and exhibit sufficient strength. Further, it can exhibit sufficient hardness and scratch resistance even with a single coating layer while exhibiting high adhesiveness to a base even without a primer layer, thereby achieving high workability and productivity in the manufacturing process.

The coating layer can be formed on only one surface of the polymeric film or can be formed on both surfaces of the polymeric film.

When the coating layer is formed on only one surface of the polymeric film, the other surface can further include one or more of another photo-curable coating layer and/or heat-curable coating layer, or other layer, membrane, or film, or the like. It is also possible to additionally form another functional layer on the coating layer.

As such, when the polarizer protective film of the present invention includes another layer, membrane, or film, or the like on the other surface of the polymeric film, the method and step of forming the same are not limited.

The polarizer protective film obtained by the manufacturing method of the present invention can exhibit scratch resistance to such an extent that scratches and grinding hardly occur on the surface of the coating layer of the polarizer protective film of the present invention and other sheets, even after applying vibration (applied vibration strength of 2.8 Grms, frequency of 20-60 Hz) for 240 seconds under a load of 300 g while stacking the coating layer of the polarizer protective film of the present invention and other sheets having convex patterns (e.g., a diffusion sheet) in a sample holder (50 mm×50 mm) connected to a vibrator.

Further, the polarizer protective film obtained by the manufacturing method of the present invention can have a pencil hardness of H or higher under a load of 500 g.

The polarizer protective film obtained by the above-described manufacturing method of the present invention can be laminated on at least one surface of a polarizer, thereby providing a polarizing plate including the polarizer protective film.

A polarizer exhibits a property capable of extracting only light vibrating in one direction from the light made incident while vibrating in various directions. This property can be achieved by stretching iodine-adsorbed PVA (polyvinyl alcohol) with a strong tensile force. For example, more specifically, a polarizer can be formed through a step of swelling a PVA film by immersing it in an aqueous solution, a step of dyeing the swollen PVA film with a dichroic material imparting polarizing properties, a step of stretching the dyed PVA film so that the dichroic dye material is arranged in parallel with the stretched direction, and a step of correcting the color of the PVA film which has undergone the stretching step. However, the polarizing plate of the present invention is not limited thereto.

According to an embodiment of the present invention, the polarizer protective film can be adhered to both surfaces of the polarizer.

According to another embodiment of the present invention, the polarizer protective film can be provided on only one surface of the polarizer, and a general purpose protective film commonly used for protecting a polarizer can be provided on the other surface of the polarizer.

In this regard, the polarizing plate can be used as a lower polarizing plate of an LCD, and the polarizer protective film of the present invention can be configured to be positioned at the lower portion in the laminated structure within an LCD.

As described above, when the polarizing plate is laminated on an LCD in such a way that the polarizer protective film is at the lower portion, it is possible to prevent the problem that, due to the unevenness of the prism sheet or the diffusion sheet provided under the polarizing plate, the lower protective film of the polarizing plate is damaged causing an increase in haze. As a result, excellent optical properties can be exhibited.

The polarizer and the polarizer protective film can be adhered to each other by lamination using an adhesive or the like. A usable adhesive is not particularly limited as long as it is known in the art. For example, a water-based adhesive, a one-component type or two-component type polyvinyl alcohol (PVA)-based adhesive, a polyurethane-based adhesive, an epoxy-based adhesive, a styrene butadiene rubber-based (SBR-based) adhesive, or a hot melt type adhesive, or the like can be used. The present invention is not limited thereto.

When the polarizer protective film of the present invention is laminated on and adhered to a polarizer, it is preferable to laminate the film in such a way that the surface thereof on which the coating layer is not formed is adhered to the polarizer, and the coating layer is positioned toward the outside of the polarizing plate.

Although the polarizing plate having the protective film of the present invention is described, for example, for the case where it is applied to an LCD, it is not limited thereto and can be utilized in various fields. For example, the present protective film can be used for applications such as mobile communication terminals, smart phones, other mobile devices, display devices, electronic blackboards, outdoor electronic signboards, and various displays. According to an embodiment of the present invention, the polarizing plate can be a TN (Twisted Nematic) or STN (Super Twisted Nematic) liquid crystal polarizing plate, and can be a polarizing plate for horizontal orientation mode such as IPS (In-Plane Switching), Super-IPS, FFS (Fringe Field Switching), etc., and a polarizing plate for vertical orientation triode.

Figure 3:
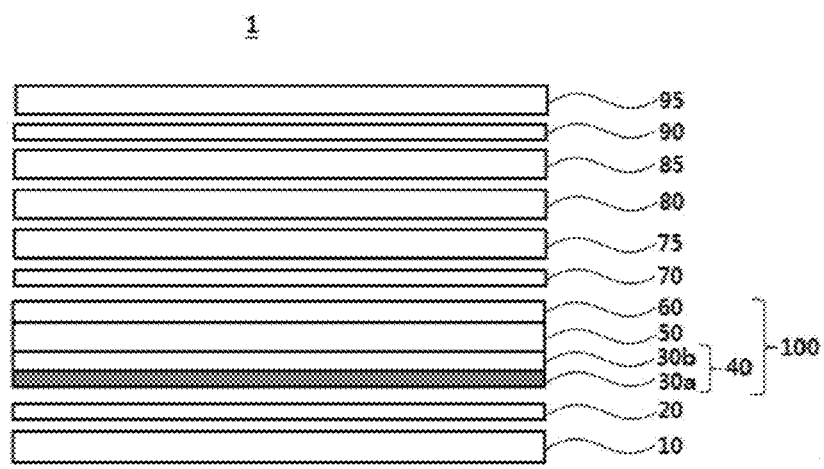
FIG. 3 illustrates a liquid crystal display according to an embodiment of the present invention.

FIG. 3 is a view showing a liquid crystal display including the polarizer protective film obtained by a manufacturing method of the present invention.

Referring to FIG. 3, a liquid crystal display device 1 includes a backlight unit 10; a prism sheet 20 provided on the backlight unit 10; and a polarizing plate 100 which is provided on the prism sheet 20 and is laminated such that a polarizer protective film 40 faces the prism sheet 20.

The backlight unit 10 includes a light source that emits light from the rear surface of the liquid crystal panel. The type of the light source is not particularly limited, and a common light source for an LCD such as CCFL, HCFL, or LED can be used.

The prism sheet 20 is provided on the backlight unit 10. The prism sheet 20 is provided to increase the brightness of light again since the light emitted from the backlight unit 10 shows decreased brightness as it passes through a light guide plate and a diffusion sheet (not shown in the drawings). The prism sheet 20 is provided under the lower polarizing plate. However, if the prism sheet 20 includes an uneven structure, there is a problem of damage to the lower protective film of the lower polarizing plate, which is in contact with the prism sheet 20, causing an increase in haze.

However, a liquid crystal display as described above is capable of solving this problem by laminating the polarizing plate 100 such that a coating layer 30a of the polarizer protective film 40 faces the prism sheet 20.

Thus, referring to FIG. 3, the polarizing plate 100 is provided on the prism sheet 20, wherein the polarizing plate 100 includes a polarizer 50 with a general purpose protective film 60 provided on one surface thereof and with the polarizer protective film 40 of the present invention adhered on the other surface, the polarizer protective film 40 including a base 30b and a coating layer 30a. In this case, the polarizing plate 100 has a structure in which the polarizer protective film 40 of the present invention is laminated to face the lower portion of an LCD, that is, the prism sheet 20. Due to such a laminated structure, it is possible to prevent the problem of damage to the polarizing plate 100 by the unevenness of the prism sheet 20, causing increased haze. As a result, excellent optical properties are exhibited.

In addition, according to an embodiment of the present invention, a diffusion sheet or a DBEF (Dual Brightness Enhancement Film) (not shown in the drawings) can be further included between the prism sheet 20 and the polarizing plate 100, or between the backlight unit 10 and the prism sheet 20. When the diffusion sheet or the DBEF film is positioned between the prism sheet 20 and the polarizing plate 100, the polarizer protective film 40 of the polarizing plate 100 comes into contact with the diffusion sheet or the DBEF film. Even in this case, it is possible to equally prevent the problems of damage of the lower polarizing plate by the diffusion sheet or the DBEF film, etc. and haze increase.

Layers provided on the upper portion of the polarizing plate 100 follow the structure of a common liquid crystal display device. FIG. 3 shows that a lower glass substrate 70, a thin film transistor 75, a liquid crystal layer 80, a color filter 85, an upper glass substrate 90, and an upper polarizing plate 95 are laminated in this order. However, the LCD of the present invention is not limited thereto, and can include all structures in which, if necessary, some of the layers shown in FIG. 3 can be changed or excluded, or another layer, substrate, film, sheet, or the like is added.

Hereinafter, actions and effects of the present invention will be described in more detail through specific examples. However, these examples are given to merely illustrate the invention and are not intended to limit the scope of the invention thereto.

EXAMPLES

Preparation of Coating Composition

Example 1

90 g of an alicyclic epoxy-based compound Celloxide 2021P (DAICEL Corp.) as a cationic curable binder, 2 g of a cationic photoinitiator Irgacure 250 (BASF Corp.), 1 g of isopropyl thioxanthone as a photo sensitizer, and 1 g of a silicon-based compound BYK-UV3500 (BYK Inc.) were mixed to prepare a coating composition.

A polymethyl methacrylate resin was subjected to a T-die film-forming apparatus under the condition of 250° C. to produce an unstretched film having a width of 800 mm and a thickness of 200 μm. The unstretched film was stretched 1.8 times in the length (MD) direction at a temperature of 135° C. to produce a uniaxially stretched film.

The coating composition was coated on the uniaxially stretched film by a bar coating method, and then stretched 2.2 times in the width (TD) direction at a temperature of 135° C.

The coating composition was irradiated with UV to produce a polarizer protective film on which a coating layer with a thickness of 2 μm was formed.

Example 2

A coating composition and a polarizing plate protective film were prepared in the same manner as in Example 1, except that 1 g of RAD2200N (Tego Inc.) instead of 1 g of BYK-UV3500 was used as the silicon-based compound.

Example 3

A polarizing plate protective film was prepared in the same manner as in Example 1, except that 1 g of RAD2250 (Tego Inc.) instead of 1 g of BYK-UV3500 was used as the silicon-based compound and the stretching ratio was 2.5 times in the width (TD) direction.

Example 4

A coating composition and a polarizing plate protective film were prepared in the same manner as in Example 1, except that 1 g of RAD2250 (Tego Inc.) instead of 1 g of BYK-UV3500 was used as the silicon-based compound.

Example 5

A coating composition and a polarizing plate protective film were prepared in the same manner as in Example 1, except that 0.3 g of RAD2010 (Tego Inc.) instead of 1 g of BYK-UV3500 was used as the silicon-based compound.

Example 6

A coating composition and a polarizing plate protective film were prepared in the same manner as in Example 1, except that 1 g of RAD2300 (Tego Inc.) instead of 1 g of BYK-UV3500 was used as the silicon-based compound.

Example 7

A coating composition was prepared in the same manner as in Example 1, except that 3 g of BYK-UV3500 instead of 1 g of BYK-UV3500 was used as the silicon-based compound.

A polymethyl methacrylate resin was subjected to a T-die film-forming apparatus under the condition of 250° C. to prepare an unstretched film having a width of 800 mm and a thickness of 200 μm. The unstretched film was sequentially stretched 1.8 times in the length (MD) direction and 2.2 times in the width (TD) direction at a temperature of 135° C. to prepare a biaxially stretched polymethyl methacrylate film.

The prepared coating composition was coated on the biaxially stretched polymethyl methacrylate film by a bar coating method, and then heat-treated at a temperature of 80° C. for 60 seconds, and irradiated with UV to prepare a polarizer protective film on which a coating layer with a thickness of 2 μm was formed.

Example 8

A coating composition and a polarizing plate protective film were prepared in the same manner as in Example 7, except that 5 g of BYK-UV3500 instead of 3 g of BYK-UV3500 was used as the silicon-based compound, and after applying the coating composition, heat treatment was performed at a temperature of 100° ° C. for 60 seconds.

Comparative Example 1

A polarizing plate protective film was prepared in the same manner as in Example 7, except that the coating composition was applied by a bar coating method, and directly irradiated with UV without a separate heat treatment process.

Comparative Example 2

A coating composition and a polarizing plate protective film were prepared in the same manner as in Example 1, except that the silicon-based compound (BYK-UV3500) was not added.

Comparative Example 3

A coating composition and a polarizing plate protective film were prepared in the same manner as in Example 1, except that 0.1 g of BYK-UV3500 instead of 1 g of BYK-UV3500 was used as the silicon-based compound.

Comparative Example 4

A coating composition and a polarizing plate protective film were prepared in the same manner as in Example 1, except that 10 g of BYK-UV3500 instead of 1 g of BYK-UV3500 was used as the silicon-based compound. However, after coating, the surface of the coated film was hazy, and even after UV irradiation, an uncured product came off the surface thereof, and as a result, a transparent polarizing plate protective film was not produced.

Experimental Example

<Measurement Method>

The physical properties of the polarizer protective films of Examples and Comparative Examples were measured by the following methods.

1) Scratch Resistance

Each coating layer of the polarizer protective films of Examples and Comparative Examples and a diffusion sheet (LG Electronics Inc., ND146) were stacked in contact with each other in a sample holder (50 mm×50 mm) connected with a vibrator, and vibration (applied vibration strength of 2.8 Grms, frequency of 20-60 Hz) was applied for 240 seconds under a load of 300 g. Thereafter, scratch and grinding occurrence on the surfaces of the coating layer of the polarizer protective film and the diffusion sheet were evaluated for scratch resistance. When no scratch and grinding were observed, it was expressed as ○. When minor scratch and grinding were observed, it was expressed as Δ. When scratch and grinding were clearly observed, it was expressed as X.

2) Pencil Hardness

Pencil hardness was measured using a pencil hardness meter (hardness tester, manufacturer: Chunghuk Tech) under a load of 500 g. According to ASTM 3363-74, the surface of the coating layer was scratched by moving a standard pencil (Mitsubishi) kept at 45 degrees while changing it from 6B to 9H, and the change in surface was observed. Each experimental value was described as an average value after 5 measurements.

3) Surface Observation

The polarizer protective film of Example 1 was cut into about 1 cm×1 cm to prepare a sample. A carbon tape was attached to a sample disk of an AFM (Atomic Force Microscope), and the sample was attached thereon. The surface of the coating layer was observed while observing the flat portion using an optical microscope. AFM 2D and 3D images of each sample thus observed are shown in FIG. 4A and FIG. 4B, respectively.

Figure 4A:
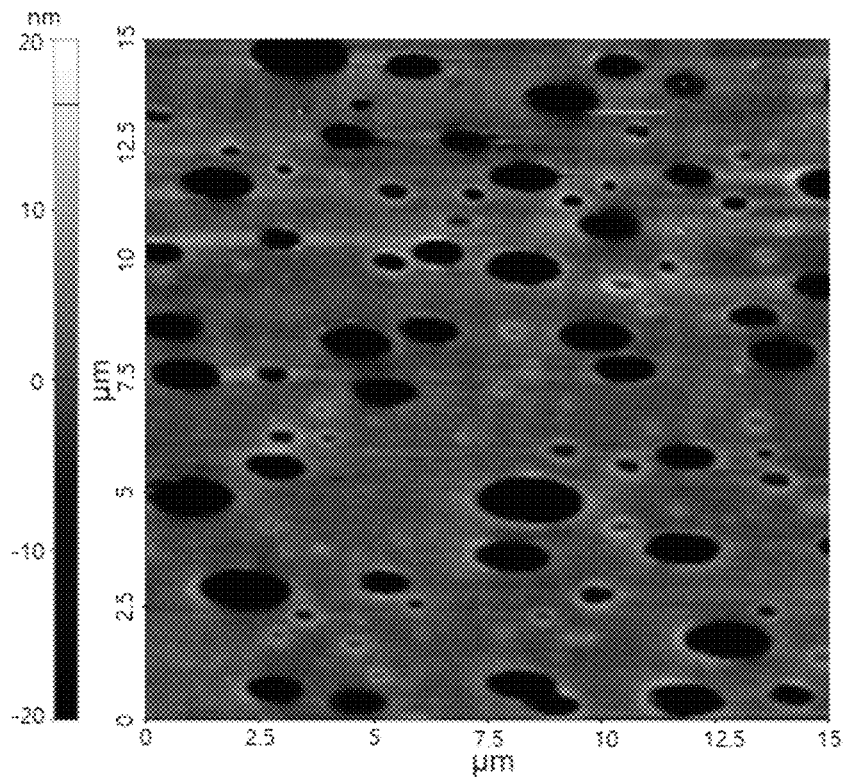
FIG. 4A and FIG. 4B show AFM (Atomic Force Microscope) 2D and 3D images, respectively, of a coating layer of a polarizer protective film according to an embodiment of the present invention.
Figure 4B:
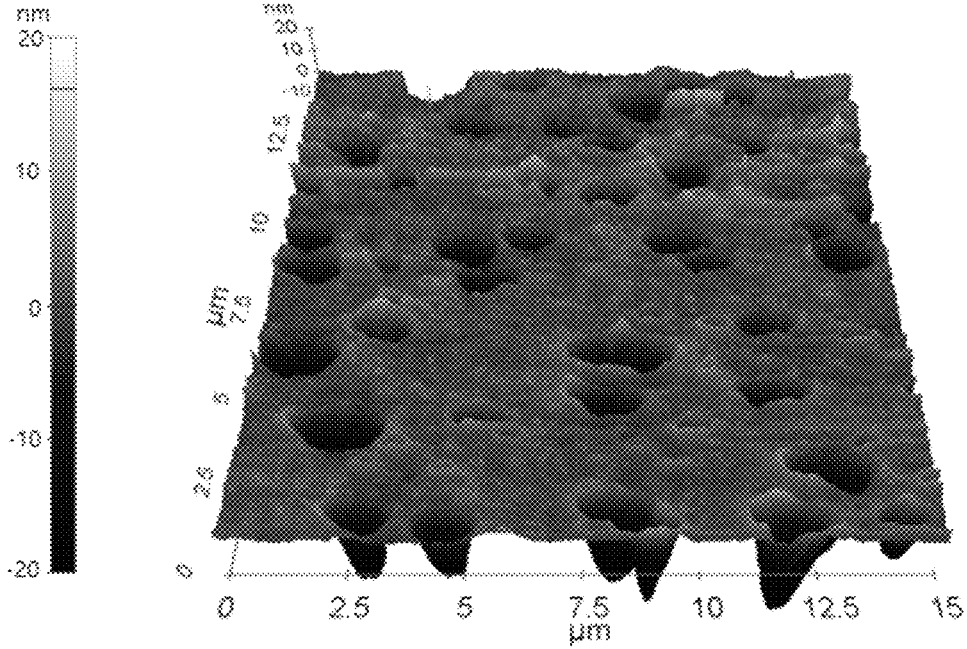

FIG. 4A shows an AFM 2D image of the surface of the coating layer of the polarizer protective film of Example 1, and FIG. 4B shows an AFM 3D image of the coating layer of the polarizer protective film of Example 1.

4) Surface Roughness

Surface roughness (Ra) of the coating layer of the polarizer protective film was measured under the following equipment and conditions.

Used equipment: X10 (Park systems)

Measurement conditions

Parameters

Mode: non-contact, Samples/line: 256×256, Scan rate: 0.6 Hz

AFM probe

PPP-NCHR (Nanosensors)

Material: Al coating on detector side of cantilever

Resonance Frequency: 204~497 kHz, Force Constant: 10~130 N/m

Thickness: 3.0~5.0 µm, Length: 115~135 µm, Width: 22.5~37.5 µm, Tip height: 5 µm Software: XEI Ra is defined by $$Ra = \sum_i^N \frac{|Z_i - Z_{cp}|}{N}.$$

Rz: the ten point (five highest peaks and five lowest valleys) average roughness.

The results of measuring the physical properties are shown in the following Table 1.

TABLE 1

| | Formation of concave embossed patterns | Scratch resistance | Pencil hardness | Surface roughness (unit: nm) |
|---|---|---|---|---|
| Example 1 | ○ | ○ | H | 5.5 |
| Example 2 | ○ | ○ | H | 5.6 |
| Example 3 | ○ | ○ | H | 3.1 |
| Example 4 | ○ | ○ | H | 3.2 |
| Example 5 | ○ | ○ | H | 2.0 |
| Example 6 | ○ | ○ | H | 2.2 |
| Example 7 | ○ | ○ | H | 8.3 |
| Example 8 | ○ | ○ | H | 13.1 |
| Comparative Example 1 | X | X | H | 0.8 |
| Comparative Example 2 | X | X | H | 0.6 |
| Comparative Example 3 | ○ | X | H | 1.2 |
| Comparative Example 4 | Uncured coating film | | | |

Referring to Table 1, the polarizer protective film having the coating layer on which a plurality of concave embossed patterns were formed and of which surface roughness satisfied the predetermined range showed excellent scratch resistance.

DESCRIPTION OF SYMBOLS

1: Liquid crystal display device
10: Backlight unit
11: Concave embossed patterns
20: Prism sheet
30a: Coating layer
30b: Base
40: Polarizer protective film
50: Polarizer
60: Protective film
70: Lower glass substrate
75: Thin film transistor
80: Liquid crystal layer
85: Color filter
90: Upper glass substrate
95: Upper polarizing plate
100: Polarizing plate

The invention claimed is:

1. A polarizer protective film comprising:
   a polymeric film, and
   a coating layer formed on at least one surface of the polymeric film,
   wherein the coating layer comprises a plurality of concave embossed patterns and has a surface roughness (Ra) of 2.0 nm to 20.0 nm,
   wherein the coating layer has a pencil hardness of H or higher under a load of 500 g,
   wherein no scratch or grinding is observed on the surface of the coating layer after the coating layer is stacked in contact with a diffusion sheet, in a 50 mm×50 mm sample holder connected with a vibrator vibrating with an applied vibration strength of 2.8 Grms, at a frequency of 20-60 Hz under a load of 300 g, for 240 seconds,
   wherein a thickness of the coating layer is 50 nm to 10 μm,
   wherein a depth of the embossed patterns is 1 nm to 500 nm,
   wherein a diameter of the embossed patterns is 0.1 μm to 20 μm,
   wherein the coating layer is formed from a photocurable coating composition which comprises a photocurable binder, a silicon-based or fluorine-based compound, and a polymerization initiator,
   wherein the silicon-based or fluorine-based compound is present in an amount from 0.2 parts by weight to 10 parts by weight with respect to 100 parts by weight of the photocurable binder,
   wherein the silicon-based or fluorine-based compound is in a state of microphase separation that forms the plurality of concave embossed patterns, and
   wherein a ratio of an outermost surface area of the plurality of concave embossed patterns with respect to a total area of the coating layer is in a range of 20% or more, and 80% or less.

2. The polarizer protective film of claim 1, wherein the polymeric film includes one or more selected from the group consisting of a polyester, a polyethylene, a cyclic olefin polymer (COP), a cyclic olefin copolymer (COC), a polyacrylate (PAC), a polycarbonate (PC), a polymethylmethacrylate (PMMA), a polyimide (PI), a triacetylcellulose (TAC), and a cellulose.

3. A method of manufacturing a polarizer protective film, the method comprising the steps of:
   coating a photocurable coating composition comprising a photocurable binder, a silicon-based or fluorine-based compound, and a polymerization initiator onto at least one surface of a polymeric film;
   heat-treating the polymeric film onto which the coating composition is coated; and
   photo-curing the coating composition to form a coating layer comprising a plurality of concave embossed patterns and a surface roughness (Ra) of 2.0 nm to 20.0 nm,
   wherein the coating layer has a pencil hardness of H or higher under a load of 500 g,
   wherein no scratch or grinding is observed on the surface of the coating layer after the coating layer is stacked in contact with a diffusion sheet, in a 50 mm×50 mm sample holder connected with a vibrator vibrating with an applied vibration strength of 2.8 Grms, at a frequency of 20-60 Hz under a load of 300 g, for 240 seconds,
   wherein a thickness of the coating layer is 50 nm to 10 μm,
   wherein a depth of the embossed patterns is 1 nm to 500 nm,
   wherein a diameter of the embossed patterns is 0.1 μm to 20 μm,
   wherein the silicon-based or fluorine-based compound is present in an amount from 0.2 parts by weight to 10 parts by weight with respect to 100 parts by weight of the photocurable binder,
   wherein the silicon-based or fluorine-based compound is in a state of microphase separation that forms the plurality of concave embossed patterns, and
   wherein a ratio of an outermost surface area of the plurality of concave embossed patterns with respect to a total area of the coating layer is in a range of 20% or more, and 80% or less.

4. The method of claim 3, wherein the heat treatment is performed at a temperature of 80° ° C. to 200° C.

5. The method of claim 3, wherein the silicon-based compound is selected from the group consisting of an unreactive compound, a reactive compound, a resin, an oil, and a surfactant, each comprising a silicon group.

6. The method of claim 3, wherein the fluorine-based compound is selected from the group consisting of an unreactive compound, a reactive compound, a resin, an oil, and a surfactant, each comprising a fluorine group.

7. The method of claim 3, wherein the photocurable binder is a cationic curable binder, and the polymerization initiator is a cationic polymerization initiator.

8. The method of claim 3, wherein the photocurable binder is a radical curable binder, and the polymerization initiator is a radical polymerization initiator.

9. The method of claim 7, wherein the cationic curable binder is an epoxy-based compound.

10. The method of claim 9, wherein the epoxy-based compound is an alicyclic epoxy-based compound.

11. The method of claim 3, comprising a step of stretching the polymeric film onto which the coating composition has been applied.

12. The method of claim 11, wherein the heat treatment step and the step of stretching the polymeric film onto which the coating composition has been applied are performed at the same time.

* * * * *